(12) United States Patent
Öhlén

(10) Patent No.: US 9,112,635 B2
(45) Date of Patent: Aug. 18, 2015

(54) METHODS AND APPARATUS FOR A PASSIVE ACCESS SUBNETWORK

(75) Inventor: Peter Öhlén, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 236 days.

(21) Appl. No.: 13/495,637

(22) Filed: Jun. 13, 2012

(65) Prior Publication Data

US 2013/0336653 A1 Dec. 19, 2013

(51) Int. Cl.
*H04J 14/02* (2006.01)

(52) U.S. Cl.
CPC ........... *H04J 14/021* (2013.01); *H04J 14/0213* (2013.01)

(58) Field of Classification Search
CPC ............. H04Q 11/0005; H04J 14/0212; H04J 14/0228
USPC .......................................... 398/43, 45, 48, 49
See application file for complete search history.

(56) References Cited

U.S. PATENT DOCUMENTS

| | | | |
|---|---|---|---|
| 4,809,362 A | 2/1989 | Claus et al. | |
| 5,301,053 A * | 4/1994 | Shikada | 398/72 |
| 6,067,288 A | 5/2000 | Miller et al. | |
| 6,493,117 B1 | 12/2002 | Milton et al. | |
| 6,567,429 B1 | 5/2003 | DeMartino | |
| 6,633,695 B2 * | 10/2003 | Bailey et al. | 385/24 |
| 6,687,463 B1 * | 2/2004 | Hutchison et al. | 398/83 |
| 6,754,403 B1 * | 6/2004 | Schmid | 385/7 |
| 6,970,617 B2 * | 11/2005 | Mao et al. | 385/24 |
| 7,024,116 B2 * | 4/2006 | Orbach et al. | 398/83 |
| 7,181,095 B1 | 2/2007 | Meli et al. | |
| 7,184,666 B1 * | 2/2007 | Li et al. | 398/83 |

(Continued)

FOREIGN PATENT DOCUMENTS

| | | |
|---|---|---|
| EP | 1703762 A2 | 9/2006 |
| WO | WO 00/76105 A1 | 12/2000 |

(Continued)

OTHER PUBLICATIONS

Shen et al: "From Coarse Grid to Mini-Grid to Gridless: How Much can Gridless Help Contentionless", OFC 2011, Mar. 6-10, 2011, paper OTul3, pp. 1-3.

(Continued)

*Primary Examiner* — Oommen Jacob

(57) ABSTRACT

An access subnetwork node herein comprises one or more add-drop modules, each module including one or more passive optical filters. The one or more add-drop modules are configured to selectively drop a fixed band of wavelength channels from an access subnetwork, via a passive directional coupler, to each of multiple client nodes that actively select to receive client-specific channels within the fixed band. The one or more add-drop modules are also configured to selectively add the fixed band of wavelength channels to the access subnetwork, as received via a passive directional coupler from the multiple client nodes that actively select to transmit client-specific channels within the fixed band. With an access subnetwork node and a client node configured in this way, embodiments herein reduce the complexity and accompanying cost of nodes in an optical network, while also maintaining flexibility for assigning wavelength channels in the network.

35 Claims, 13 Drawing Sheets

(56) References Cited

U.S. PATENT DOCUMENTS

| | | | |
|---|---|---|---|
| 7,200,331 B2 | 4/2007 | Roorda et al. | |
| 7,450,847 B1 * | 11/2008 | Frigo et al. | 398/59 |
| 7,483,636 B2 | 1/2009 | Aoki et al. | |
| 7,546,043 B2 * | 6/2009 | Kai et al. | 398/213 |
| 7,599,620 B2 | 10/2009 | Graves et al. | |
| 7,657,181 B2 | 2/2010 | Terai et al. | |
| 7,860,396 B2 | 12/2010 | Claringburn et al. | |
| 8,521,024 B2 * | 8/2013 | Wellbrock et al. | 398/58 |
| 8,582,090 B2 * | 11/2013 | Chen et al. | 356/73.1 |
| 8,693,880 B2 * | 4/2014 | Sakauchi et al. | 398/140 |
| 2001/0046350 A1 * | 11/2001 | Tedesco | 385/37 |
| 2001/0051019 A1 * | 12/2001 | Bailey et al. | 385/37 |
| 2002/0191250 A1 * | 12/2002 | Graves et al. | 359/128 |
| 2004/0052530 A1 * | 3/2004 | Tian et al. | 398/83 |
| 2004/0141746 A1 * | 7/2004 | Oberg | 398/59 |
| 2004/0153492 A1 | 8/2004 | Cao et al. | |
| 2004/0165891 A1 * | 8/2004 | Kopelovitz et al. | 398/83 |
| 2004/0184809 A1 * | 9/2004 | Miyata et al. | 398/85 |
| 2004/0197099 A1 * | 10/2004 | Kai et al. | 398/85 |
| 2004/0212897 A1 * | 10/2004 | Tedesco | 359/663 |
| 2005/0025489 A1 * | 2/2005 | Aldridge et al. | 398/83 |
| 2005/0084262 A1 * | 4/2005 | Oberg et al. | 398/19 |
| 2005/0259571 A1 * | 11/2005 | Battou | 370/217 |
| 2005/0275921 A1 * | 12/2005 | Haus et al. | 359/247 |
| 2006/0110162 A1 * | 5/2006 | Tian et al. | 398/83 |
| 2006/0275034 A9 * | 12/2006 | Way et al. | 398/59 |
| 2007/0212068 A1 * | 9/2007 | Miyazaki et al. | 398/57 |
| 2008/0013950 A1 * | 1/2008 | Boudreault et al. | 398/59 |
| 2008/0044184 A1 * | 2/2008 | Popovic | 398/82 |
| 2008/0317466 A1 | 12/2008 | Chung et al. | |
| 2009/0047019 A1 * | 2/2009 | Palacharla et al. | 398/59 |
| 2009/0052896 A1 * | 2/2009 | Kazawa et al. | 398/58 |
| 2009/0110402 A1 * | 4/2009 | Bernstein et al. | 398/79 |
| 2009/0220228 A1 * | 9/2009 | Popovic | 398/48 |
| 2010/0014859 A1 | 1/2010 | D'Alessandro et al. | |
| 2010/0209038 A1 * | 8/2010 | Popovic et al. | 385/1 |
| 2011/0135305 A1 | 6/2011 | Barnard | |
| 2011/0236021 A1 | 9/2011 | Presi et al. | |
| 2011/0274425 A1 * | 11/2011 | Grobe | 398/3 |
| 2012/0183294 A1 * | 7/2012 | Boertjes et al. | 398/49 |
| 2012/0201541 A1 | 8/2012 | Patel et al. | |
| 2012/0251117 A1 | 10/2012 | Patel et al. | |
| 2013/0156422 A1 * | 6/2013 | Maeda et al. | 398/34 |
| 2013/0243416 A1 | 9/2013 | Dahlfort et al. | |
| 2013/0336653 A1 * | 12/2013 | Ohlen | 398/49 |
| 2014/0023372 A1 | 1/2014 | Sambo et al. | |

FOREIGN PATENT DOCUMENTS

| | | | | |
|---|---|---|---|---|
| WO | WO 0076105 A1 * | 12/2000 | | |
| WO | WO 2007048650 A1 * | 5/2007 | | H04J 14/02 |
| WO | WO 2010/025767 A1 | 3/2010 | | |
| WO | WO 2012/025148 A1 | 3/2012 | | |

OTHER PUBLICATIONS

Acharya S. et al. "PESO: Low Overhead Protection for Ethernet over SONET Transport", INFOCOM 2004, the whole document.

Dahlfort S. et al. "Split Spectrum Approach to Elastic Optical Networking", ECOC 2012, the whole document.

Gringeri St. et al., "Technical Considerations for Supporting Data Rates Beyond 100 Gb/s", IEEE Comm. Mag., Feb. 2012, the whole document.

ITU-T G.7042/Y.1305 (Mar. 2006), "Link capacity adjustment scheme (LCAS) for virtual concatenated signals", Mar. 2006, the whole document.

ITU-T G.707/Y.1322 (01/07), "Network node interface for the synchronous digital hierarchy (SDH)", Jan. 2007, the whole document.

Jinno M., et al., "Spectrum-Efficient and Scalable Elastic Optical Path Network: Architecture, Benefits, and Enabling Technologies", IEEE Comm. Mag.,47(11), Nov. 2009, the whole document.

Patel A.N. et al., "Routing, Wavelength Assignment, and Spectrum Allocation Algorithms in Transparent Flexible Optical WDM Networks", Optical Switching and Networking, Elsevier, NL, Feb. 7, 2012, the whole document.

Patel A.N. et al., "Routing, Wavelength Assignment, and Spectrum Allocation in Wavelength-Convertible Flexible Optical WDM (WC-FWDM) Networks", Optical Fiber Communication Conference and Exposition (OFC/NFOEC), 2012, and The National Fiber Optic Engineers Conference, IEEE, Mar. 4, 2012, the whole document.

Thiagarajan S. et al. "Spectrum efficient super-channels in dynamic flexible grid networks—a blocking analysis", OSA/OFC/NFOEC,2011, the whole document.

Li Y. et al., "Flexible Grid Label Format in Wavelength Switched Optical Network draft-li-ccamp-flexible-grid-label-00", Network Working Group, Internet Draft, Jul. 4, 2011, the whole document.

Strasser, et al. "Wavelength-Selective Switches for ROADM Applications", IEEE J. of Sel. Topics in Quant. El., V. 16, N. 5, Sep./Oct. 2010, the whole document.

* cited by examiner

METHODS AND APPARATUS FOR A PASSIVE ACCESS SUBNETWORK

TECHNICAL FIELD

The present invention generally relates to methods and apparatus associated with an access subnetwork, and particularly relates to an access subnetwork node, a client node connected to that access subnetwork node, a wavelength assignment node, and methods implemented by those nodes.

BACKGROUND

Increasing the flexibility with which an optical transport network can assign and route wavelength channels has traditionally increased the efficiency of the network. Reconfigurable optical add/drop multiplexers (ROADMs) have greatly contributed to this increased flexibility by enabling wavelength channels to be selectively added or dropped at any node in the network. However, ROADMs employ fairly complex and expensive components to provide this flexible capability. Furthermore, many of these components are active, meaning that the ROADMs require a power supply infrastructure and an interface for managing faults and upgrades. ROADMs thus prove prohibitive in some contexts.

One such context relates to a network that efficiently transports the traffic of multiple services in a converged fashion. Rather than employing multiple different networks in parallel for transporting these different services (e.g., mobile, business, and residential services), a converged network transports those services together using the same network. A transport network that optically converges different services by transporting those services on different wavelength channels would be advantageous, for a variety of reasons, but has heretofore been stifled by long deployment cycles of equipment, organizational boundaries, and operator considerations. Such a transport network would be advantageous for instance because of its potential for large scalability and efficiency.

SUMMARY

Embodiments herein advantageously reduce the complexity and accompanying cost of nodes in an optical network, as compared to known networks, while also maintaining flexibility for assigning and routing wavelength channels in the network. With reduced complexity and cost, the embodiments prove particularly useful for optically converging the traffic of multiple services.

More particularly, embodiments herein include an access subnetwork node that comprises one or more add-drop modules. Each add-drop module includes one or more passive optical filters. These one or more add-drop modules are configured to selectively drop a fixed band of wavelength channels from an access subnetwork, via a passive directional coupler, to each of multiple client nodes that actively select to receive client-specific channels within the fixed band. The one or more add-drop modules are also configured to selectively add the fixed band of wavelength channels to the access subnetwork, as received via a passive directional coupler from the multiple client nodes that actively select to transmit client-specific channels within the fixed band.

In at least some embodiments, the access subnetwork comprises an access subnetwork ring. In this case, the one or more add-drop modules are configured to resiliently drop the fixed band from either arm of the access subnetwork ring to each of the client nodes, and to resiliently add the fixed band to both arms of the access subnetwork ring.

In one embodiment, for example, an add-drop module comprises a 4-port passive optical filter. This filter has two ports connected to different arms of the access subnetwork ring and two ports connected to the one or more passive directional couplers. In another embodiment, by contrast, an add-drop module comprises a pair of 3-port passive optical filters. These 3-port filters have one port connected to different arms of the access subnetwork ring, one port connected to the other filter in the pair, and one port connected to the one or more passive directional couplers.

In at least one embodiment, this access subnetwork ring comprises a bidirectional ring formed from first and second rings of unidirectional optical fiber. In this case, the access subnetwork node comprises first and second add-drop modules. The first module is configured to selectively drop the fixed band from the first ring, via a first one of the passive directional couplers, to each of the client nodes and selectively add the fixed band to the first ring as received via a second one of the passive directional couplers. Similarly, the second module is configured to selectively drop the fixed band from the second ring, via the first coupler, to each of the client nodes and selectively add the fixed band to the second ring via the second coupler.

In any case, the one or more add-drop modules in some embodiments comprise a single add-drop module. This single module is configured to selectively drop and add the fixed band via the same passive directional coupler. In other embodiments, though, the one or more add-drop modules comprise multiple add-drop modules. These multiple modules are each configured to selectively drop and add the fixed band via different passive directional couplers.

In some embodiments, the access subnetwork node actually comprises the one or more passive directional couplers. In other embodiments, though, the access subnetwork node excludes these one or more passive directional couplers, meaning that the node connects to client nodes via the one or more couplers but does not itself include those couplers.

Corresponding embodiments herein also include a client node. This client node comprises a receiver configured to actively select to receive a client-specific channel within a fixed band of wavelength channels that an access subnetwork node selectively drops from an access subnetwork, via a passive directional coupler, to the client node. The client node also comprises a transmitter configured to actively select to transmit a client-specific channel within the fixed band, via a passive directional coupler, to the access subnetwork node for selective addition of the fixed band to the access subnetwork.

In some embodiments, the receiver is a coherent optical receiver comprising an optical local oscillator configured to perform the above-mentioned active selection. In this case, for example, the transmitter in some embodiments is configured to transmit a client-specific channel with light from said optical local oscillator. In other embodiments, by contrast, the client node's receiver comprises a tunable selection filter configured to perform the active selection.

Embodiments herein also include a wavelength assignment node. The wavelength assignment node comprises one or more interfaces configured to communicatively couple the wavelength assignment node to client nodes directly or indirectly via one or more intermediate nodes. The wavelength assignment node further comprises an assignment controller. This controller is configured to obtain assignment constraint information that indicates different fixed bands of wavelength channels associated with different access subnetwork nodes. The controller is also configured to dynamically assign wavelength channels to client nodes by constraining the possible wavelength channels assignable to any given client node to the fixed band of wavelength channels that is associated with the access subnetwork node to which the client node is connected. Finally, the controller is configured to transmit channel assignments to the client nodes via the one or more interfaces.

Embodiments herein also include corresponding methods implemented by respective nodes.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
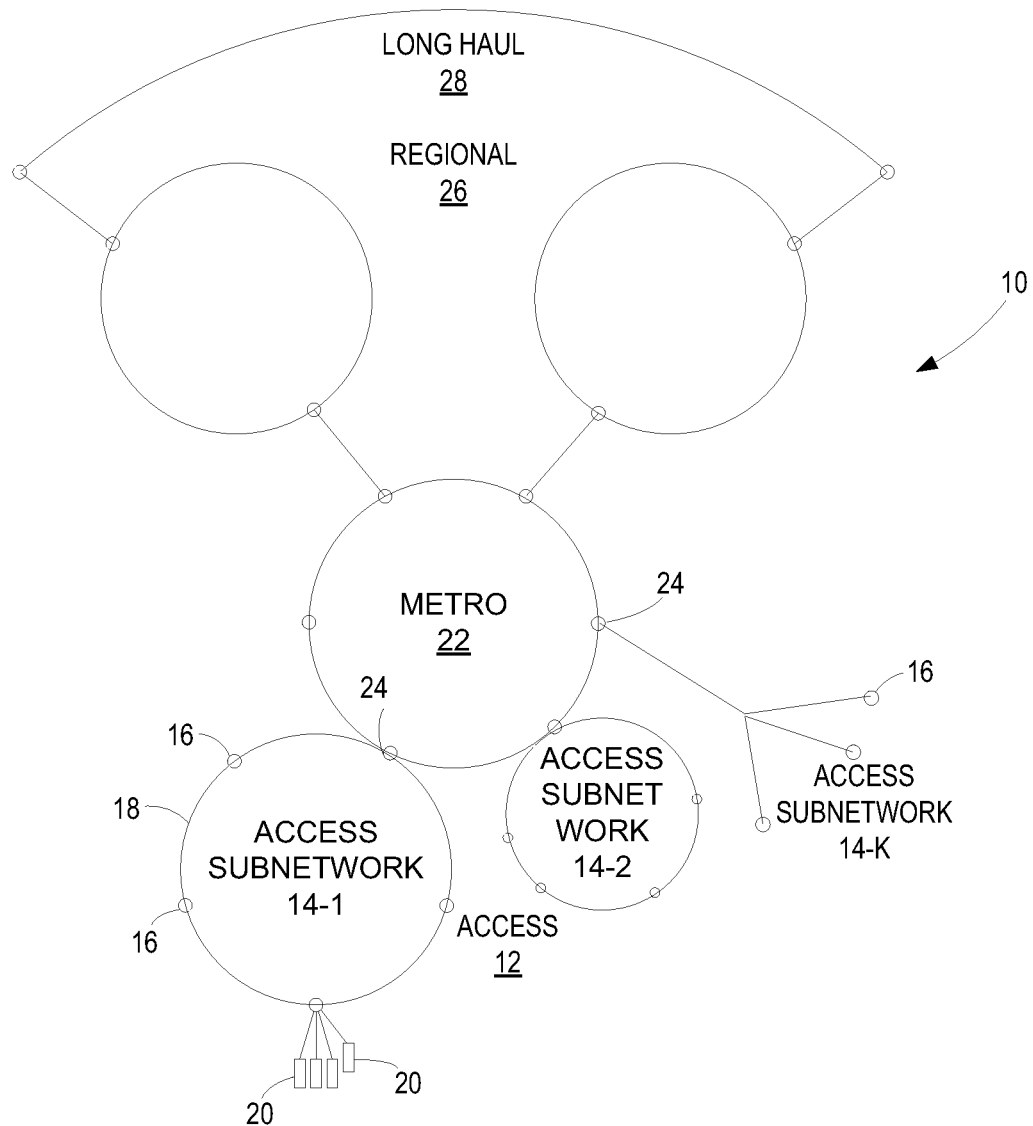
FIG. 1 is a block diagram of a generic tiered architecture for optical transport networks configured to transport wavelength division multiplexed (WDM) traffic, according to one or more embodiments.

FIG. 1 illustrates a generic tiered architecture 10 for optical transport networks configured to transport wavelength division multiplexed (WDM) traffic using different wavelength channels. The lowest tier shown, tier 1, is an access network 12 comprising a plurality of access subnetworks 14-1, 14-2, . . . 14-K. Each access subnetwork 14-k is formed from multiple access subnetwork nodes 16 interconnected via optical fiber 18. When the nodes 16 of an access subnetwork 14 are interconnected in a ring structure, as shown for access subnetworks 14-1 and 14-2, the access subnetwork 14 is referred to as an access subnetwork ring. An access subnetwork ring in this regard provides resiliency against the failure of an access subnetwork node 16 and the failure of optical fiber 18. The nodes 16 of an access subnetwork 14 may of course be interconnected in other structures as well, including a tree structure (as shown for access subnetwork 14-K), a bus structure, a mesh structure, or any combination thereof.

In general, each access subnetwork node 16 connects to one or more client nodes 20, e.g., a remote radio unit, a base station, a DSLAM, a GPON/EPON ONT, a packet switch, a router, or other node. Connected to one or more client nodes 20, an access subnetwork node 16 effectively aggregates the wavelength channels on which those client nodes 20 transmit uplink traffic and places (i.e., adds) the aggregated wavelength channels onto the access subnetwork 14 it forms. Similarly, the access subnetwork node 16 drops from the access subnetwork 14 the wavelength channels on which downlink traffic is transmitted to those client nodes 20.

The access network 12 in turn connects to a higher-tiered network; namely, a metro network 22 at tier 2. The metro network 22 is formed from a plurality of interconnected central offices (COs) 24 and transports WDM traffic for the access network 12. In this regard, each CO 24 adds wavelength channels from one or more access subnetworks 14 to the metro network 22 and drops wavelength channels from the metro network 22 to one or more access subnetworks 14. For example, FIG. 1 illustrates a CO 24 as adding wavelength channels from access subnetwork 14-1 (and other access subnetworks 14 not shown) to the metro network 22 and drops wavelength channels from the metro network 22 to access subnetwork 14-1. In an analogous manner, the metro network 22 connects to a higher-tiered network called the regional network 26, which in turn connects to a long haul network 28 for inter-regional transport.

Known implementation approaches to this tiered architecture 10 configure each access subnetwork node 16 with a fair amount of routing flexibility. Each access subnetwork node 16 in known approaches, for example, includes a reconfigurable optical add/drop multiplexer (ROADM) that enables flexibility with regard to which wavelength channels are to be selectively added or dropped. However, because ROADMs employ fairly complex and expensive components to provide this flexible capability, including for instance a power supply infrastructure and an interface for managing faults and upgrades, known implementations prove cost-prohibitive and/or operationally limited in some contexts.

Embodiments herein advantageously reduce the complexity and accompanying cost of access subnetwork nodes 16, while also maintaining wavelength channel flexibility. For example, at least some embodiments herein simply employ passive components at access subnetwork nodes 16 to reduce the complexity and cost of those nodes 16, and employ active components in client nodes 20 to provide for wavelength channel flexibility. Regardless, because the embodiments provide wavelength flexibility at reduced complexity and cost, the embodiments prove useful in a wider range of applications, such as optically converging the traffic of multiple services.

Figure 2:
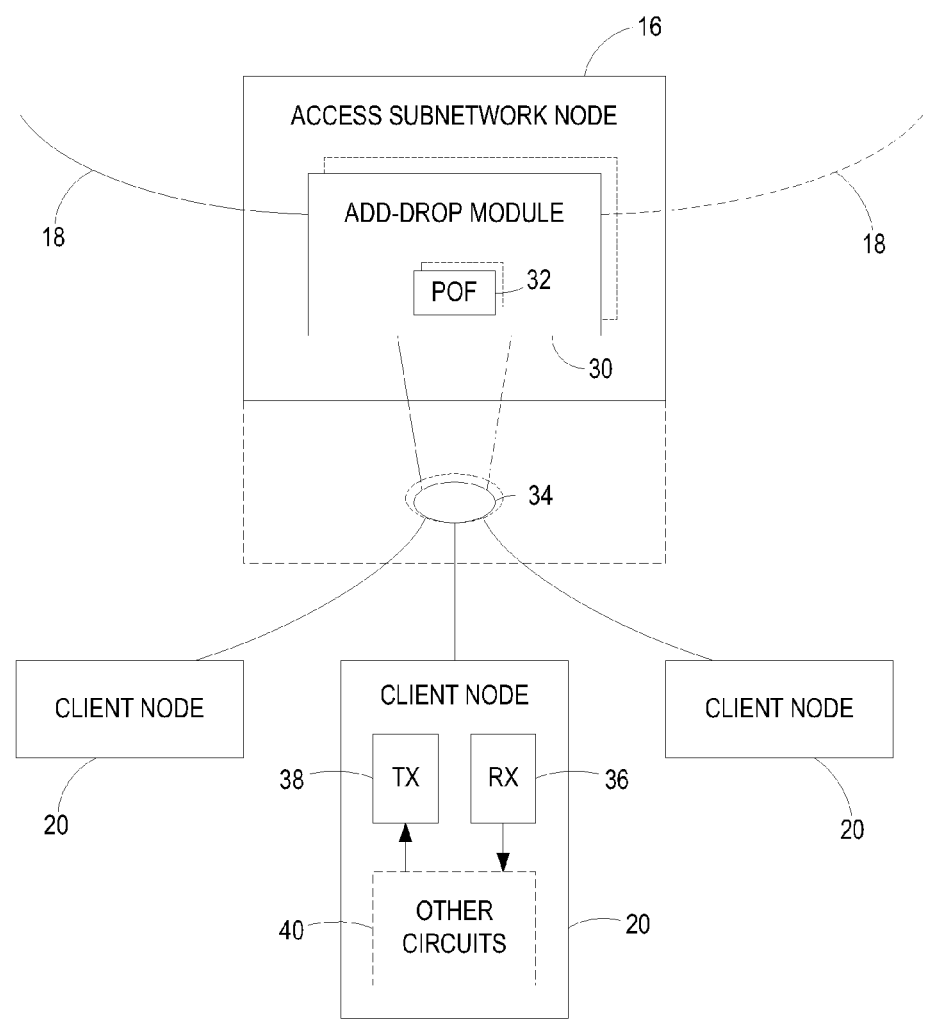
FIG. 2 is a block diagram of an access subnetwork node and a client node configured according to one or more embodiments.

More particularly, FIG. 2 illustrates an access subnetwork node 16 according to one or more embodiments. The access subnetwork node 16 interconnects via optical fiber 18 with one or more other access subnetwork nodes 16 (not shown) in any type of structure (e.g., ring, tree, bus, etc.) to form an access subnetwork 14-k. The access subnetwork node 16 also connects to multiple client nodes 20.

Connected with other access subnetwork nodes 16 and client nodes 20 in this way, the access subnetwork node 16 comprises one or more add-drop modules 30. Each of these add-drop modules 30 includes one or more passive optical filters (POFs) 32 (e.g., bandpass filters). In some embodiments, the access subnetwork node 16 itself also comprises one or more passive directional couplers 34 via which the node 16 connects to client nodes 20. In other embodiments, though, the access subnetwork node 16 excludes these one or more passive directional couplers 34, meaning that the node 16 connects to client nodes 20 via the couplers 34 but does not itself include those couplers 34.

Regardless of whether or not the node 16 itself includes the one or more passive directional couplers 34, the one or more add-drop modules 30 are configured to selectively drop a fixed band of wavelength channels from the access subnetwork 14-k, via a passive directional coupler 34, to each of multiple client nodes 20 that actively select to receive client-specific channels within the fixed band. The one or more add-drop modules 32 are also configured to selectively add the fixed band of wavelength channels to the access subnetwork 14-k, as received via a passive directional coupler 34 from the multiple client nodes 20 that actively select to transmit client-specific channels within the fixed band.

A client node 20, as shown in FIG. 2, correspondingly includes a receiver 36 and a transmitter 38, along with one or more other circuits 40, e.g., for processing information that is received or that is to be transmitted over a client-specific channel. The client node's receiver 36 is configured to actively select to receive a client-specific channel within the fixed band of wavelength channels that the access subnetwork node 16 selectively drops from the access subnetwork 14-k, via a passive directional coupler 34, to the client node 20. Similarly, the client node's transmitter 38 is configured to actively select to transmit a client-specific channel within the fixed band, via a passive directional coupler 34, to the access subnetwork node 16 for selective addition of the fixed band to the access subnetwork 14-k.

Configuring the access subnetwork node 16 and client node 20 in this way advantageously reduces the cost and complexity of the access subnetwork node 16, as the node 16 need not include a ROADM or any other active components in order to selectively add and drop the same fixed band of wavelength channels as described above (i.e., the node 16 need not actively select which band of wavelength channels to add or drop). Yet the configuration still provides for flexibility in the way that wavelength channels are assigned to the client nodes 20, since any given client node 20 actively selects from among the wavelength channels in the fixed band for transmission and reception. Because a client node 20 employs active components for transmission and reception anyway, imposing this active channel selection on the client node 20 rather than the access subnetwork node 16 increases the cost and complexity of the client node 20 only marginally as compared to the cost and complexity savings gained in the access subnetwork node 16.

Figure 3:
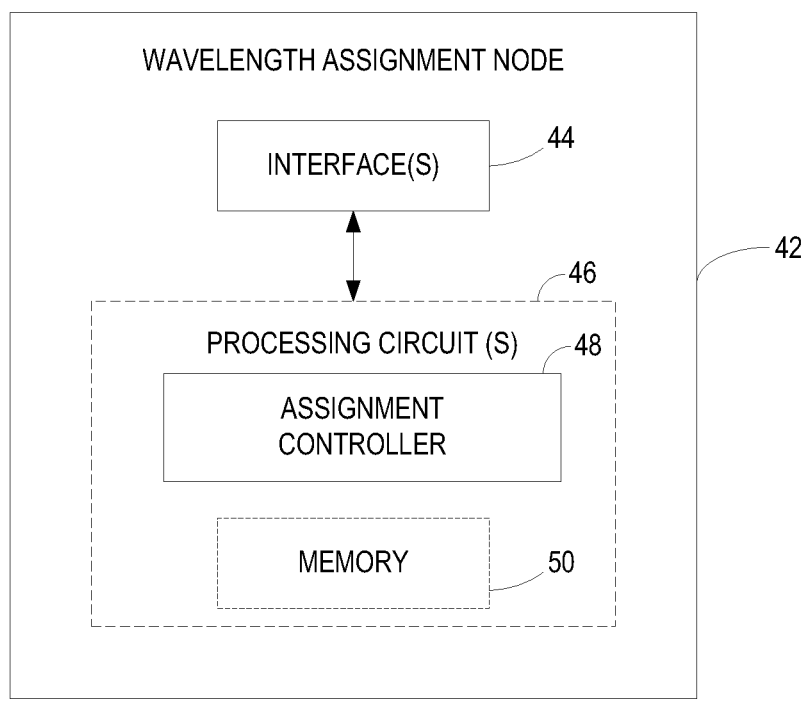
FIG. 3 is a block diagram of a wavelength assignment node configured according to one or more embodiments.

FIG. 3 illustrates a wavelength assignment node 42 for flexibly assigning wavelength channels to client nodes 20 according to one or more embodiments. The wavelength assignment node 42 may assign wavelength channels in this way based on either global assignment information or local assignment information, depending respectively on whether the wavelength channels are terminated at a centrally or locally positioned head-end (not shown). Where the channels are terminated centrally, the node 42 may be implemented as a central server in the optical network 10. Where the channels are terminated locally, the node 42 may be implemented as a router, a carrier Ethernet switch, a centralized baseband site, a radio network controller, etc. Regardless, the wavelength assignment node 42 as shown includes one or more interfaces 44 configured to communicatively couple the wavelength assignment node 42 to client nodes 20 via one or more intermediate nodes (not shown). The wavelength assignment node 42 further includes one or more processing circuits 46. As shown, these one or more processing circuits 46 comprise an assignment controller 48.

The assignment controller 48 is configured to obtain assignment constraint information that indicates different fixed bands of wavelength channels associated with different access subnetwork nodes 16. In some embodiments, the controller 48 obtains this constraint information from memory 50. In other embodiments, though, the controller 48 obtains the information by receiving it from another node in the network 10, with or without further processing of the information received. In any event, the controller 48 is configured to dynamically assign wavelength channels to client nodes 20 in accordance with the obtained constraint information. Specifically, the controller 48 is configured to dynamically assign wavelength channels to client nodes 20 by constraining the possible wavelength channels assignable to any given client node 20 to the fixed band of wavelength channels that is associated with the access subnetwork node 16 to which the client node 20 is connected. The controller 48 then transmits these channel assignments to the client nodes 20 via the one or more interfaces 44.

Accordingly, rather assigning wavelength channels to client nodes 20 with unlimited flexibility, the wavelength assignment node 42 assigns channels to client nodes 20 with flexibility that is constrained by the fixed bands that respective access subnetwork nodes 16 selectively drop and add. For example, in assigning a wavelength channel to a particular client node 20 connected to a particular access subnetwork node 16, the wavelength assignment node 42 constrains the possible wavelength channels assignable to that particular client node 20 to the wavelength channels within the fixed band that the particular access subnetwork node 16 drops and adds, rather than flexibly considering any wavelength channel within any fixed band to be assignable to the client node 20.

Figure 4A:
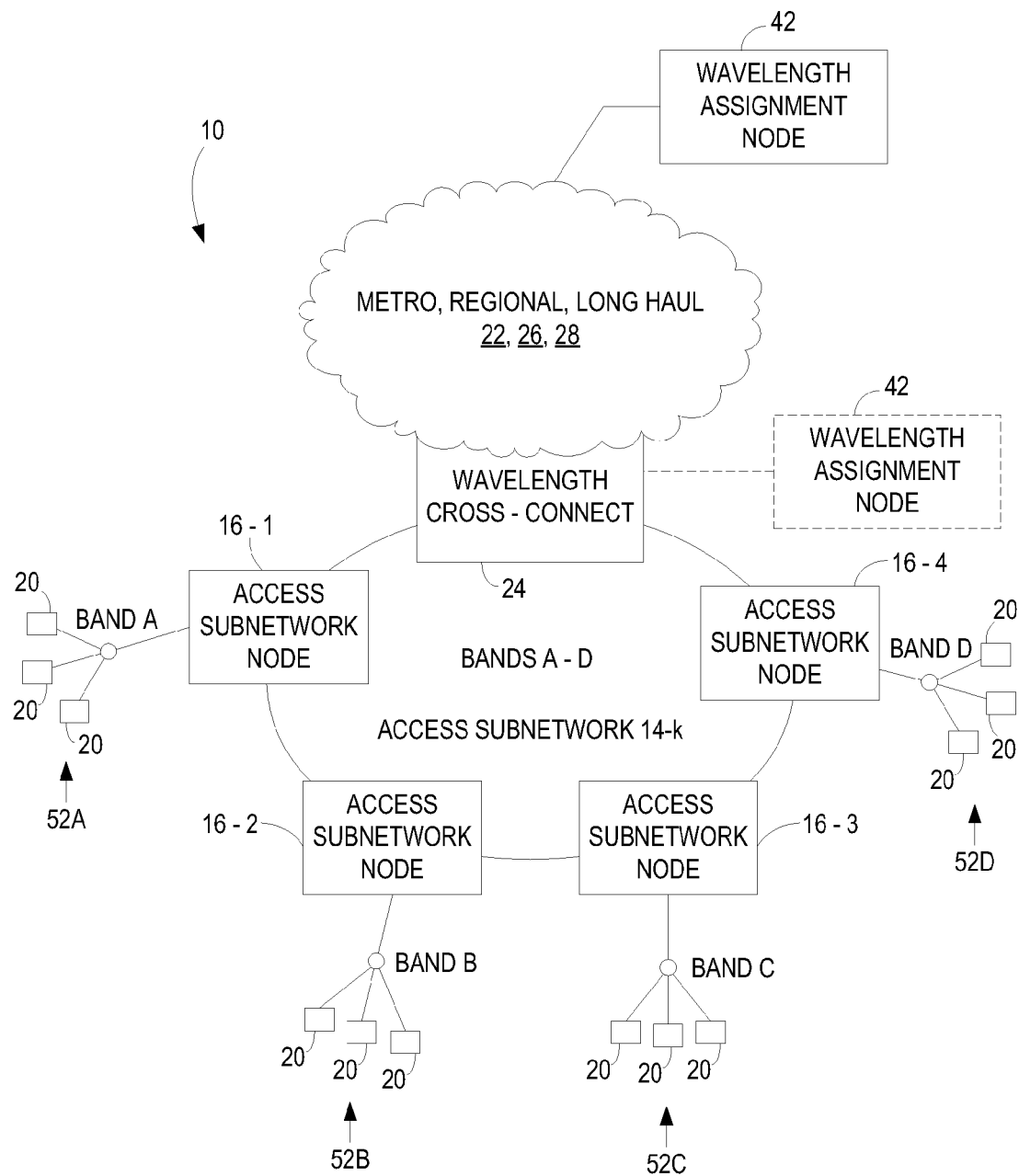
FIGS. 4A-4B illustrate an example of an access subnetwork node, a client node, and a wavelength assignment node configured for resilience in an access subnetwork ring according to one or more embodiments.
Figure 4B:
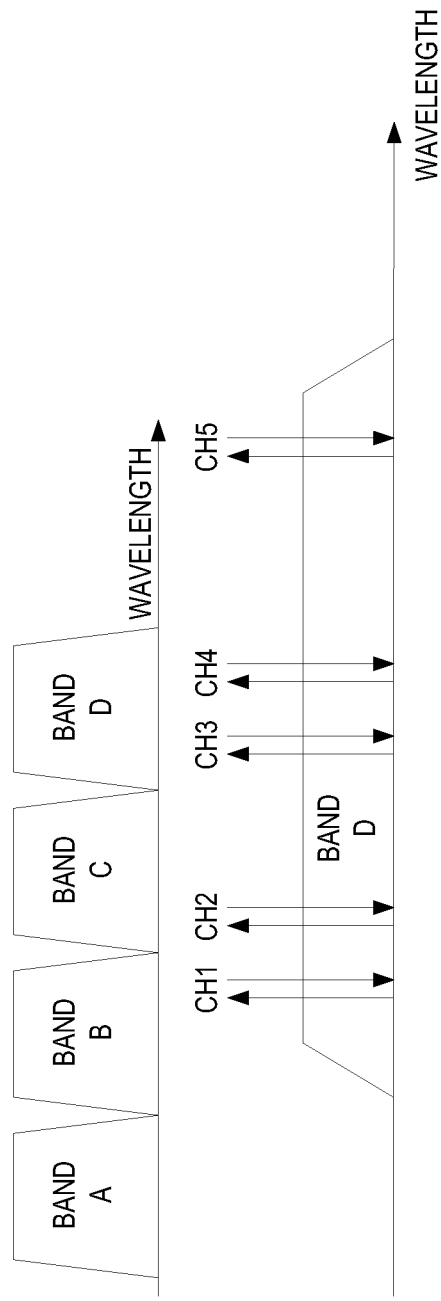

FIGS. 4A-4B illustrate a simple example of the above in the context of embodiments where the access subnetwork 14-k is an access subnetwork ring. As shown, the access subnetwork ring 14-k is formed from four access subnetwork nodes 16-1, 16-2, 16-3, and 16-4. Access subnetwork node 16-1 connects a first set 52A of client nodes 20 to the access subnetwork ring 14-k. In doing so, access subnetwork node 16-1 is configured to selectively drop a fixed band A of wavelength channels to each client node 20 in this first set 52A and to selectively add the fixed band A to the access subnetwork ring 14-k, as received from the client nodes 20 in the first set 52A. Similarly, access subnetwork 16-2 connects a second set 52B of client nodes 20 and is configured to selectively drop and add a fixed band B, access subnetwork node 16-3 connects a third set 52C of client nodes 20 and is configured to selectively drop and add a fixed band C, and access subnetwork node 16-4 connects a fourth set 52D of client nodes 20 and is configured to selectively drop and add a fixed band D.

With the ring 14-k configured in this way, the wavelength assignment node 42 obtains constraint information indicating that fixed band A is associated with node 16-1, fixed band B is associated with node 16-2, fixed band C is associated with node 16-3, and fixed band D is associated with node 16-4. In accordance with this constraint information, the wavelength assignment node 42 constrains the possible channels assignable to client nodes 20 in the first set 52A to the channels within fixed band A, constrains the possible channels assignable to client nodes 20 in the second set 52B to the channels within fixed band B, constrains the possible channels assignable to client nodes 20 in the third set 52C to the channels within fixed band C, and constrains the possible channels assignable to client nodes 20 in the fourth set 52D to the channels within fixed band D. With the possible channels assignable constrained in this way, though, the wavelength assignment node 42 otherwise flexibly assigns wavelength channels to the client nodes 20. As shown in FIG. 4B, for instance, the wavelength assignment node 42 dynamically assigns or re-assigns any given channel 1-5 within the fourth band D to any given client node 20 in the fourth set 52D, e.g., by assigning channel 1 to one client node 20, assigning channel 2 to another client node 20, and so on. Assigned a particular, client-specific channel in this way, a client node 20 may transmit and/or receive information over that channel. As illustrated in FIG. 4B, a client node 20 reuses an assigned wavelength channel for both transmission and reception, e.g., according to inverse return to zero/return to zero (IRZ/RZ) wavelength re-use. See, for instance, Presi et al, "A 80 km reach fully passive WDM-PON based on reflective ONUs", Optics Express, vol. 16, no. 23, pp 19043-19048, 10 Nov. 2008.

In one or more embodiments, the head-end transmits traffic to a client node 20 over a wavelength channel assigned to the client node 20, based on knowledge of the fixed band associated with the access subnetwork node 16 to which the client node 20 is connected. Specifically, in some embodiments, the head-end transmits traffic to the client node 20 using coarse wavelength tuning to address the access subnetwork node 16 to which the client node 20 is connected. In one embodiment, for instance, the head-end employs a tunable laser for such addressing, as well as for ensuring channels within a fixed band are separable.

Regardless, in at least some embodiments, a wavelength cross-connect 24 via which the wavelength channels are transmitted resiliently routes those wavelength channels to protect against the failure of nodes 16 or optical fibers 18 forming the subnetwork ring 14-$k$. In one embodiment, for example, the cross-connect 24 dynamically switches between adding a wavelength channel onto one arm of the ring 14-$k$ (e.g., in the clockwise direction) and adding the channel onto the other arm of the ring 14-$k$ (e.g., in the counter-clockwise direction), responsive to failure of a node 16 or fiber 18. Similarly, the cross-connect 24 dynamically switches between listening for a wavelength channel from one arm of the ring 14-$k$ and listening for the channel from the other arm of the ring 14-$k$, responsive to such failure.

Correspondingly, in such embodiments the one or more add-drop modules 30 of any given access subnetwork node 16 are configured to resiliently drop the node's respective fixed band from either arm of the ring 14-$k$ (depending on the arm to which the cross-connect 24 added that fixed band) to each connected client node 20. Because the one or more modules 30 are configured to drop the fixed band from either arm of the ring, the module(s) 30 may receive that fixed band over a different arm in the event of a fiber 18 or node 16 failure on the other arm. Likewise, those one or more add-drop modules 30 are configured to resiliently add the fixed band to both arms of the ring 14-$k$, so that the cross-connect 24 can dynamically select from which arm to receive the fixed band. This way, the module(s) 30 proactively guard against a fiber 18 or node 16 failure on one arm preventing the transport of the fixed band.

Figure 5:
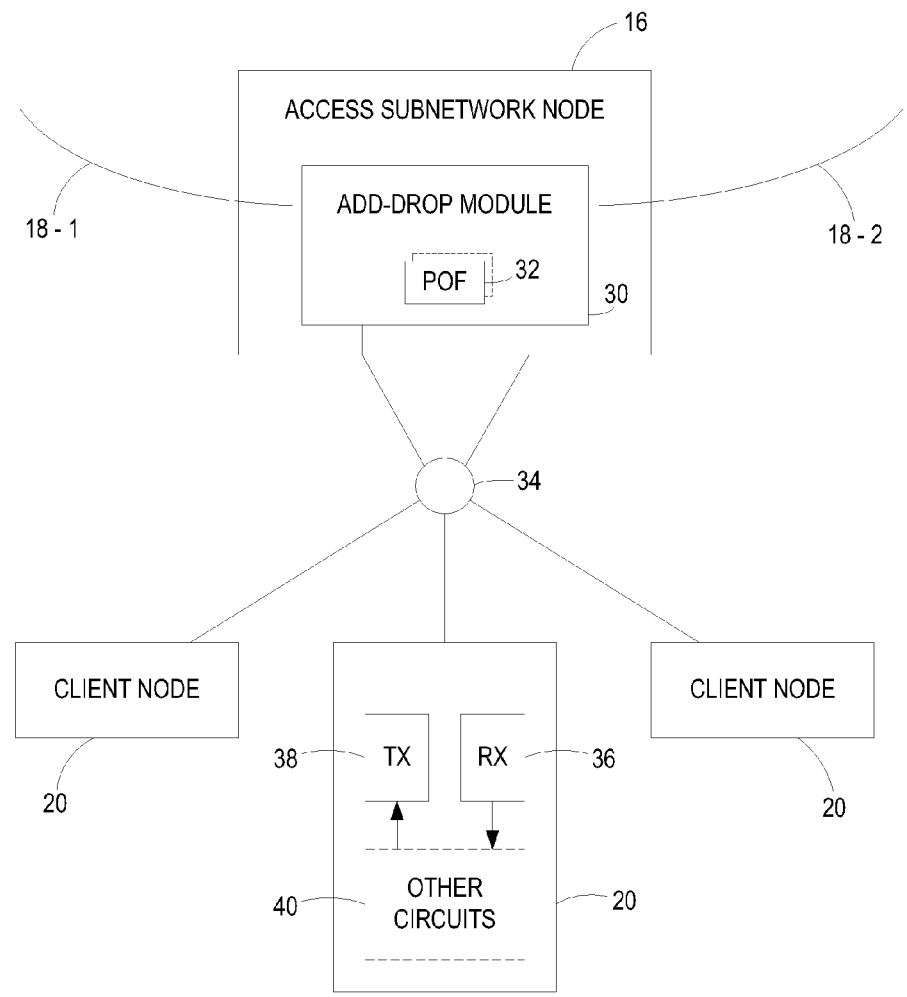
FIG. 5 is a block diagram of an access subnetwork node and a client node connected via a single passive directional coupler according to one or more embodiments.

FIG. 5 depicts an access subnetwork node 16 according to one example of these embodiments where the ring 14-$k$ is formed from a ring of bidirectional optical fiber 18. As shown in FIG. 5, the access subnetwork node 16 comprises a single add-drop module 30, which includes one or more passive optical filters 32. This single add-drop module 30 is configured to resiliently drop a fixed band from either arm 18-1, 18-2 of the ring 14-$k$, via a 2:N passive directional coupler 34, to each of multiple client nodes 20. That is, regardless of from which arm 18-1, 18-2 the module 30 receives the fixed band, the module 30 drops that band to each of the client nodes 20 and thereby facilitates resilience against the failure of fiber 18 and nodes 16. The single add-drop module 30 is also configured to resiliently add the fixed band to both arms 18-1, 18-2 of the ring 14-$k$. In doing so, the module 30 is configured to add the fixed band via the same 2:N passive directional coupler 34 as that via which the module 30 drops the fixed band. That is, the module 30 drops the fixed band to client nodes 20 via coupler 34, and also receives the fixed band for addition from the client nodes 20 via coupler 34. Correspondingly, the transmitter 38 of any given client node 20 actively selects to transmit a client-specific channel within the fixed band to the access subnetwork node 16 via the same passive directional coupler 34 as that via which the client node 20 is dropped the fixed band.

Figure 6A:
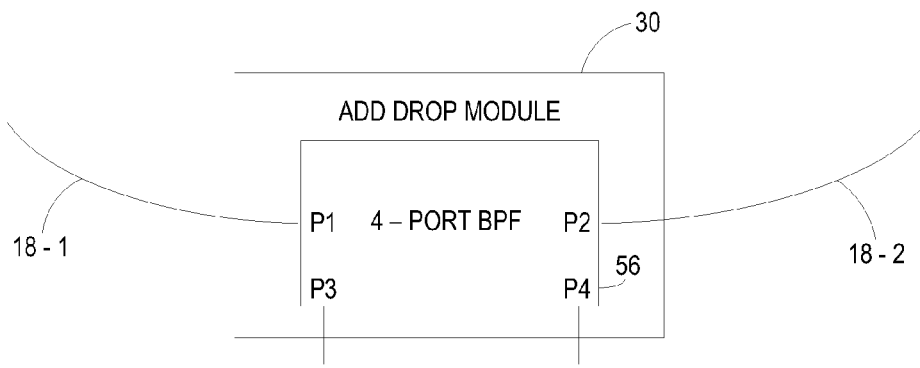
FIGS. 6A-6B are block diagrams of an add-drop module and a 4-port passive optical filter according to one or more embodiments.

In at least some embodiments, this single add-drop module 30 comprises a 4-port bandpass filter (BPF) 56 as shown in FIG. 6A. The 4-port filter 56 has two ring-side ports P1, P2 connected to different arms 18-1, 18-2 of the access subnetwork ring 14-$k$. The filter 56 also has two client-side ports P3, P4 connected to the 2 ports of the 2:N passive directional coupler 34. Connected in this way, the 4-port filter 56 maps ports P1 and P3 together, and maps ports P2 and P4 together, meaning that ports P1 and P3 correspond to arm 18-1 of the ring 14-$k$ while ports P2 and P4 correspond to arm 18-2 of the ring 14-$k$. When the filter 56 receives the fixed band over arm 18-1 at port P1, the filter 56 selectively drops that fixed band to port P3. Likewise, when the filter 56 receives the fixed band over arm 18-2 at port P2, the filter selectively drops that fixed band to port P4. The filter 56 operates in an analogous manner for adding the fixed band from ports P3 and P4 to respective ports P1 and P2.

Figure 6B:
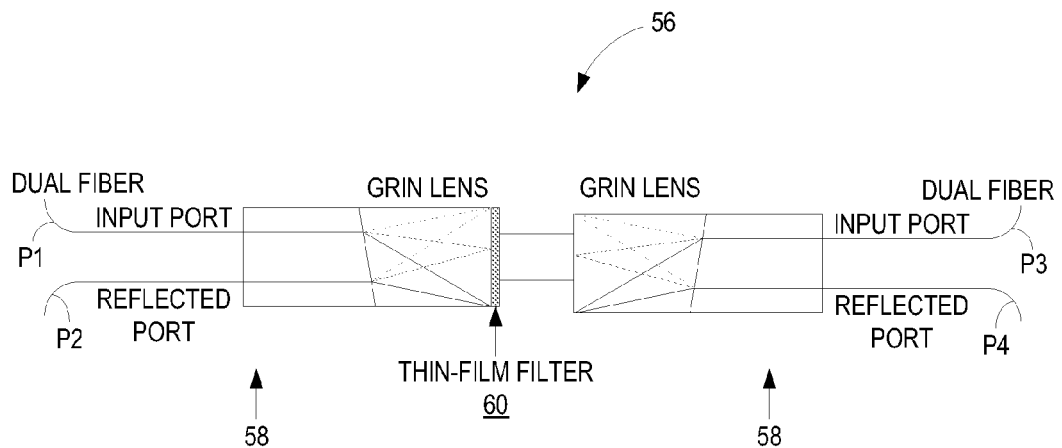

FIG. 6B illustrates this 4-port filter 56 according to one or more embodiments. As shown in FIG. 6B, the filter 56 comprises a dual-fiber collimator 58 (which in one example uses a GRIN lens) on each side of a thin film filter 60. The different input ports P1 and P3 of the different collimators 58 are connected to different arms 18-1 and 18-2 of the ring 14-$k$, while the different reflected ports P2 and P4 of the different collimators 58 are connected to the 2:N passive directional coupler 34.

Figure 7A:
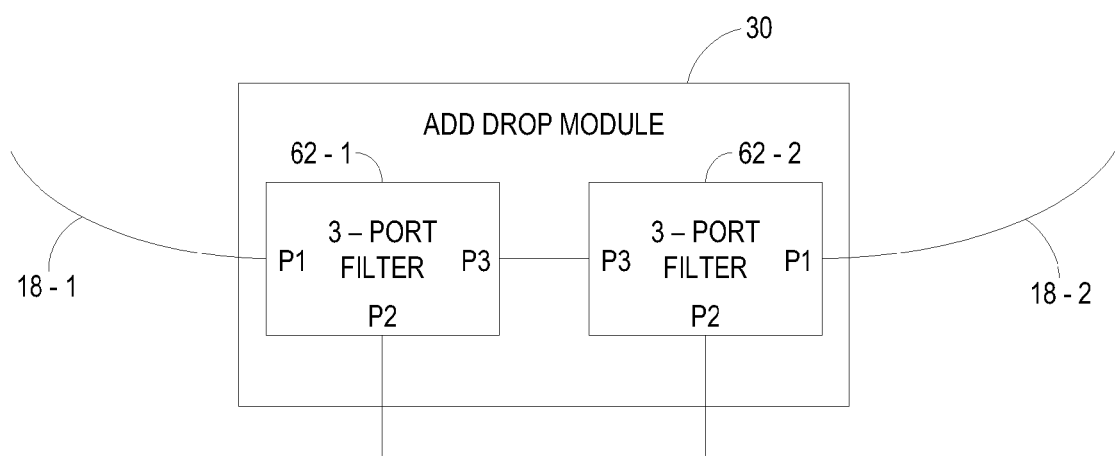
FIGS. 7A-7B are block diagrams of an add-drop module and a pair of 3-port passive optical filters according to one or more embodiments.

In other embodiments, such as those shown in FIG. 7A, the single add-drop module 30 comprises a pair of 3-port passive optical filters 62-1 and 62-2. The different filters 62-1 and 62-2 in the pair each have one ring-side port P1 connected to different arms 18-1, 18-2 of the ring 14-$k$, one port client-side P2 connected to the 2:N passive directional coupler 34, and one pass port P3 connected to the other filter in the pair.

Figure 7B:
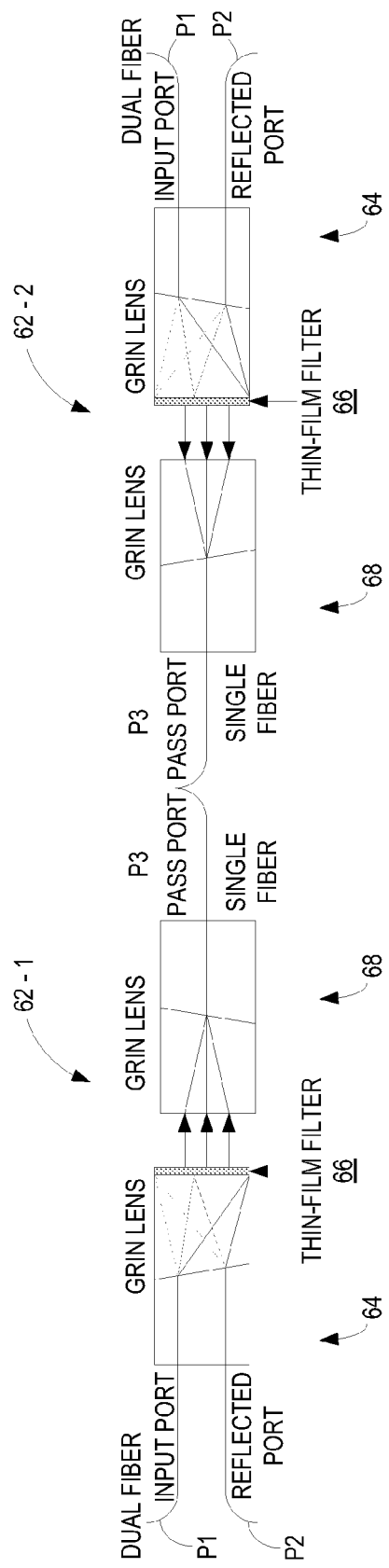

FIG. 7B illustrates additional details of this pair of filters 62-1 and 62-2 according to one or more embodiments. As shown in FIG. 7B, each 3-port filter 62-1, 62-2 comprises a dual-fiber collimator 64 on one side of a thin film filter 66, and a single-fiber collimator 68 on the other side of the thin film filter 66. The different input ports P1 of the different dual-fiber collimators 64 are connected to different arms 18-1, 18-2 of the ring 14-$k$, while the different reflected ports P2 of the different dual-fiber collimators 64 are connected to the 2:N passive directional coupler 34. The single-fiber collimators 68 are connected together at the different pass ports P3 of the 3-port filters 62-1, 62-2.

Figure 8:
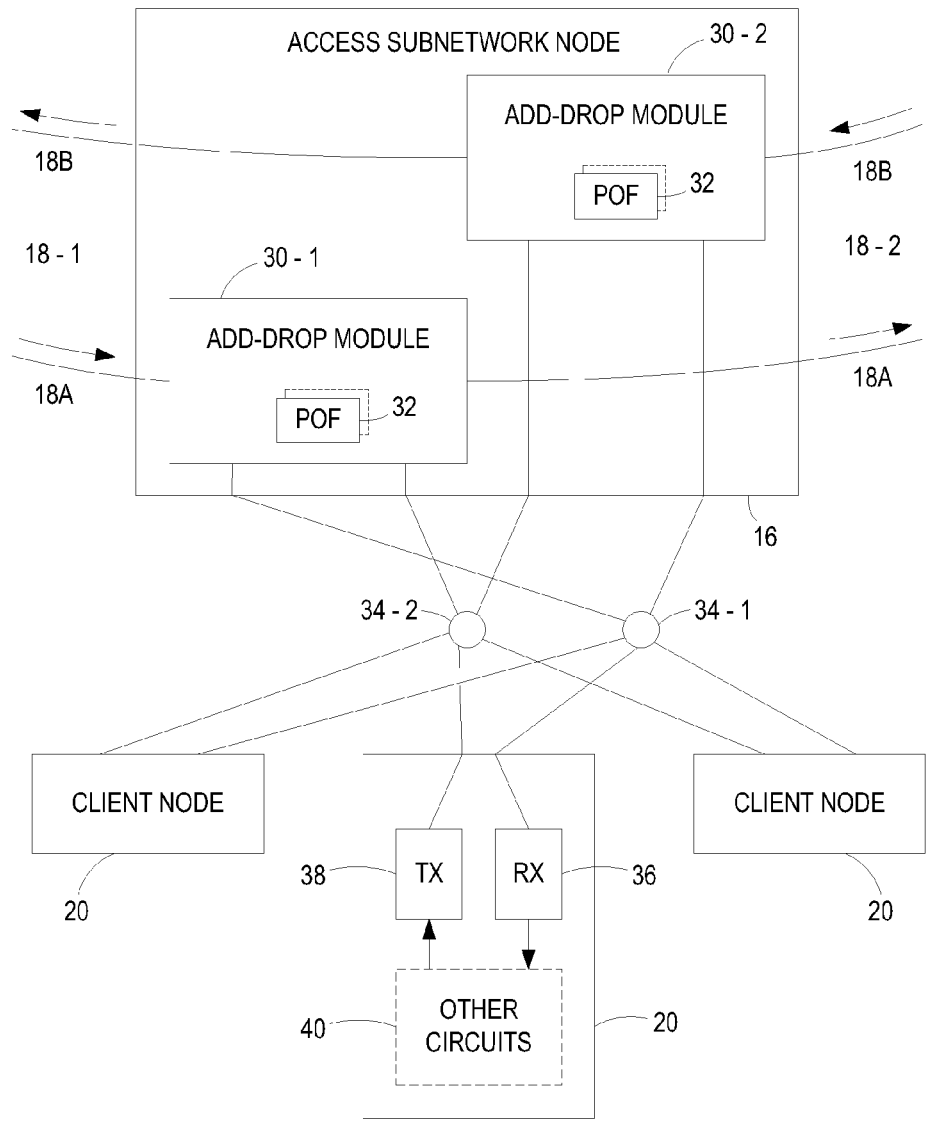
FIG. 8 is a block diagram of an access subnetwork node and a client node connected via multiple passive directional couplers according to one or more embodiments.

Contrasted with FIG. 5, FIG. 8 illustrates an access subnetwork node 16 according to a different example of embodiments where the node 16 resiliently adds and drops the fixed band and where the ring 14-$k$ is formed from first and second rings 18A, 18B of unidirectional optical fiber 18. As shown in FIG. 8, the first ring 18A transports wavelength channels in the counter-clockwise direction, while the second ring 18B transports wavelength channels in the clockwise direction. With the rings 18A, 18B configured in this way, the access subnetwork node 16 comprises two different add-drop modules 30-1, 30-2 rather than just a single add-drop module 30. Each of these different add-drop modules 30-1, 30-2 includes one or more passive optical filters 32. Add-drop module 30-1 controls selective addition and dropping for the first ring 18A, while add-drop module 30-2 controls selective addition and dropping for the second ring 18B In cooperation, add-drop modules 30-1 and 30-2 are configured to resiliently drop the fixed band from either arm 18-1, 18-2 of the ring 14-$k$, via two 2:N passive directional couplers 34-1 and 34-2, to each of multiple client nodes 20. The modules 30-1 and 30-2 are also configured to resiliently add the fixed band to both arms 18-1, 18-2 of the ring 14-$k$. In doing so, the modules 30-1 and 30-2 are configured to add the fixed band via a different 2:N passive directional coupler 34-1, 34-2 than the 2:N coupler 34-2, 34-1 via which the modules 30 drop the fixed band. As shown, for example, the modules 30-1, 30-2 drop the fixed band to client nodes 20 via coupler 34-1, and receive the fixed band for addition from the client nodes 20 via coupler 34-2. Correspondingly, the transmitter 38 of any given client node 20 actively selects to transmit a client-specific channel within the fixed band to the access subnetwork node 16 via a different passive directional coupler 34-1, 34-2 than the coupler 34-2, 34-1 via which the client node 20 is dropped the fixed band.

More particularly, add-drop module 30-1 is configured to selectively drop the fixed band from the first ring 18A, via passive directional coupler 34-1, to each of the multiple client nodes 20. Add-drop module 30-1 is also configured to selectively add the fixed band to the first ring 18A, as received via passive directional coupler 34-2. Similarly, add-drop module 30-2 is configured to selectively drop the fixed band from the second ring 18B, via passive directional coupler 34-1, to each of the multiple client nodes 20, and to selectively add the fixed band to the second ring 18B, as received via the second passive directional coupler 34-2.

In at least some embodiments, either or both of the add-drop modules 30-1 and 30-2 are implemented as described above with respect to FIGS. 6A-6B and/or FIGS. 7A-7B. That is, either or both of modules 30-1 and 30-2 may be implemented as a 4-port bandpass filter or a pair of 3-port filters. However, rather than both ring-side ports of a module 30-1, 30-2 being connected to both ports of the same 2:N coupler 34, different ring-side ports of the module are connected to different 2:N couplers 34-1, 34-2 as shown in FIG. 8.

More particularly, where both modules 30-1 and 30-2 are implemented as 4-port bandpass filters, the fixed band is received from either arm 18-1, 18-2 of the access subnetwork ring 14-$k$ at a downlink ring-side port of either of the 4-port filters. The fixed band is then output at a respective downlink client-side port of that 4-port filter connected to couplers 34-1, 34-2. Similarly, the fixed band is received, via couplers 34-1, 34-2, at uplink client-side ports of both 4-port filters. The fixed band is then output at uplink ring-side ports of both 4-port filters.

Conversely, where both modules 30-1 and 30-2 are each implemented as a pair of 3-port filters, each pair includes a downlink 3-port filter and an uplink 3-port filter. The fixed band is received from either arm 18-1, 18-2 of the access subnetwork at a downlink ring-side port of either downlink 3-port filter. The fixed band is then output at a client-side port of that downlink 3-port filter, and other bands are passed out a pass port of the downlink 3-port filter to the uplink 3-port filter in the pair. Similarly, the fixed band is received at the client-side ports of both uplink 3-port filters and output at the ring-side ports of both uplink 3-port filters.

Those skilled in the art will understand that no particular type of wavelength division multiplexing (WDM) is required to practice the above embodiments. Thus, the embodiments may employ coarse WDM, dense WDM, or ultra-dense WDM. In one embodiment, for instance, the embodiments utilize 10 bands of 3 nm in a 32 nm range, meaning that there is around 2 nm or 250 GHz available for wavelength channels (assuming 1 nm guard bands between wavelength bands). With 25 GHz channel spacing, each access subnetwork node 16 would selectively drop and add a fixed band of 8 wavelength channels.

Those skilled in the art will also appreciate that no particular type of modulation scheme is required to practice the above embodiments. Some embodiments, for example, employ a wavelength-reuse-based modulation scheme (e.g., an IRZ/RZ modulation scheme as noted above), whereby the same wavelength channel is used by a client node 20 for both transmission and reception. In this and other cases, the client node's receiver 36 in at least one embodiment comprises a tunable selection filter configured to perform the active selection described above.

Other embodiments, by contrast, employ a coherent modulation scheme. In one embodiment, for example, the client node's receiver 36 is a coherent optical receiver. In this case, the coherent optical receiver comprises an optical local oscillator configured to perform the active selection described above, such that the active selection or filtering is implemented as an integral part of the receiver processing. In one embodiment, integrated photonics and silicon photonics are used for realizing a cost-effective implementation of such a receiver. Regardless, in at least one embodiment, the client node's transmitter 38 is correspondingly configured to transmit a client-specific channel with light from the optical local oscillator. This advantageously provides automatic wavelength tracking of uplink and downlink. Moreover, embodiments based on such a coherent modulation scheme prove advantageous in the sense that they have a high power budget and allow for a greater number of wavelength channels within any given band or a greater number of access subnetwork nodes 16 within an access subnetwork 14.

Figure 9:
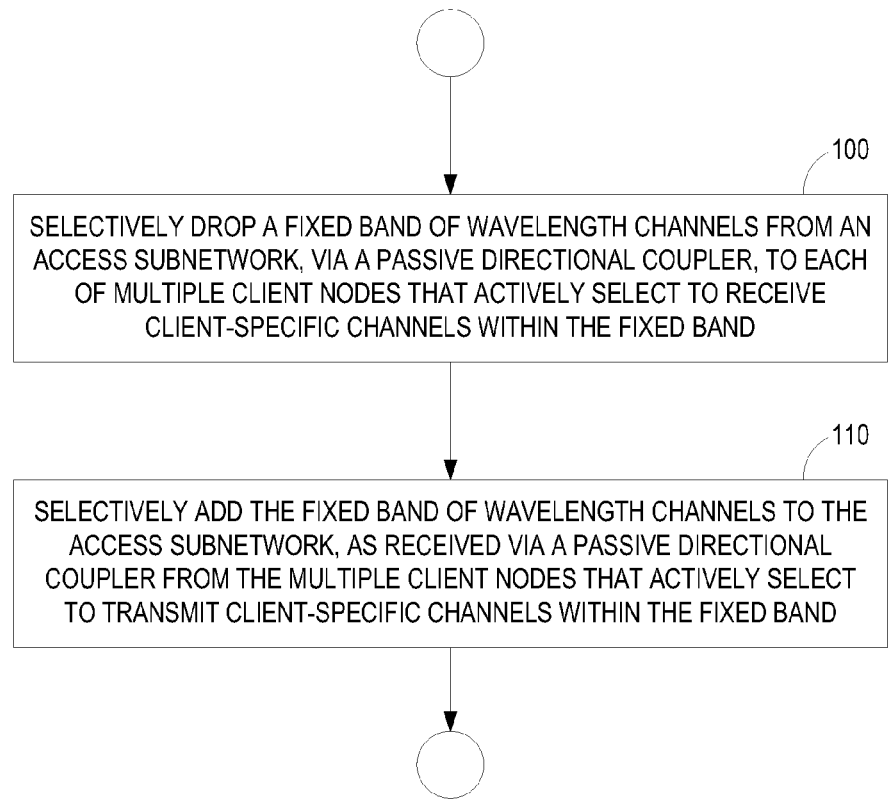
FIG. 9 is a logic flow diagram of a method implemented by an access subnetwork node according to one or more embodiments.

In view of the above modifications and variations, those skilled in the art will appreciate that an access subnetwork node 16 herein generally performs the processing shown in FIG. 9. As shown in FIG. 9, processing includes selectively dropping a fixed band of wavelength channels from an access subnetwork 14, via a passive directional coupler 34, to each of multiple client nodes 20 that actively select to receive client-specific channels within the fixed band (Block 100). Processing further entails selectively adding the fixed band of wavelength channels to the access subnetwork 14, as received via a passive directional coupler 34 from the multiple client nodes 20 that actively select to transmit client-specific channels within the fixed band (Block 110).

Figure 10:
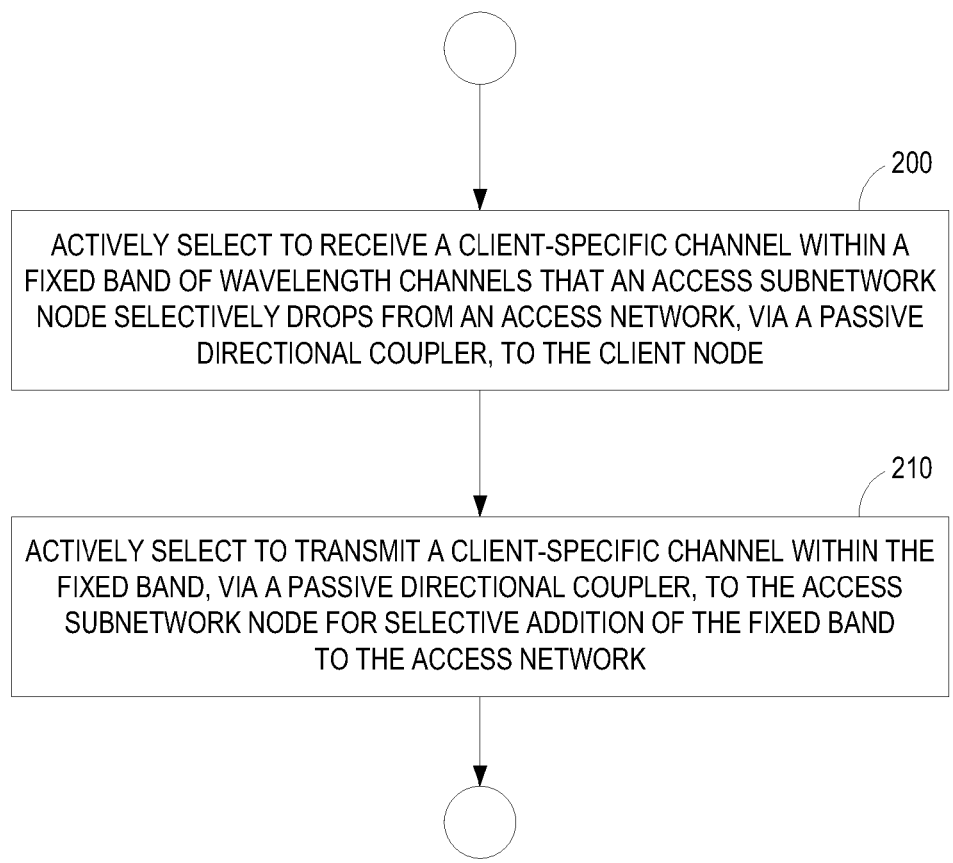
FIG. 10 is a logic flow diagram of a method implemented by a client node according to one or more embodiments.

Those skilled in the art will also appreciate that a client node 20 herein generally performs corresponding processing shown in FIG. 10. As depicted in FIG. 10, such processing includes actively selecting to receive a client-specific channel within a fixed band of wavelength channels that an access subnetwork node 16 selectively drops from an access subnetwork 14, via a passive directional coupler 34, to the client node 20 (Block 200). Processing further entails actively selecting to transmit a client-specific channel within the fixed band, via a passive directional coupler 34, to the access subnetwork node 16 for selective addition of the fixed band to the access subnetwork 14 (Block 200).

Figure 11:
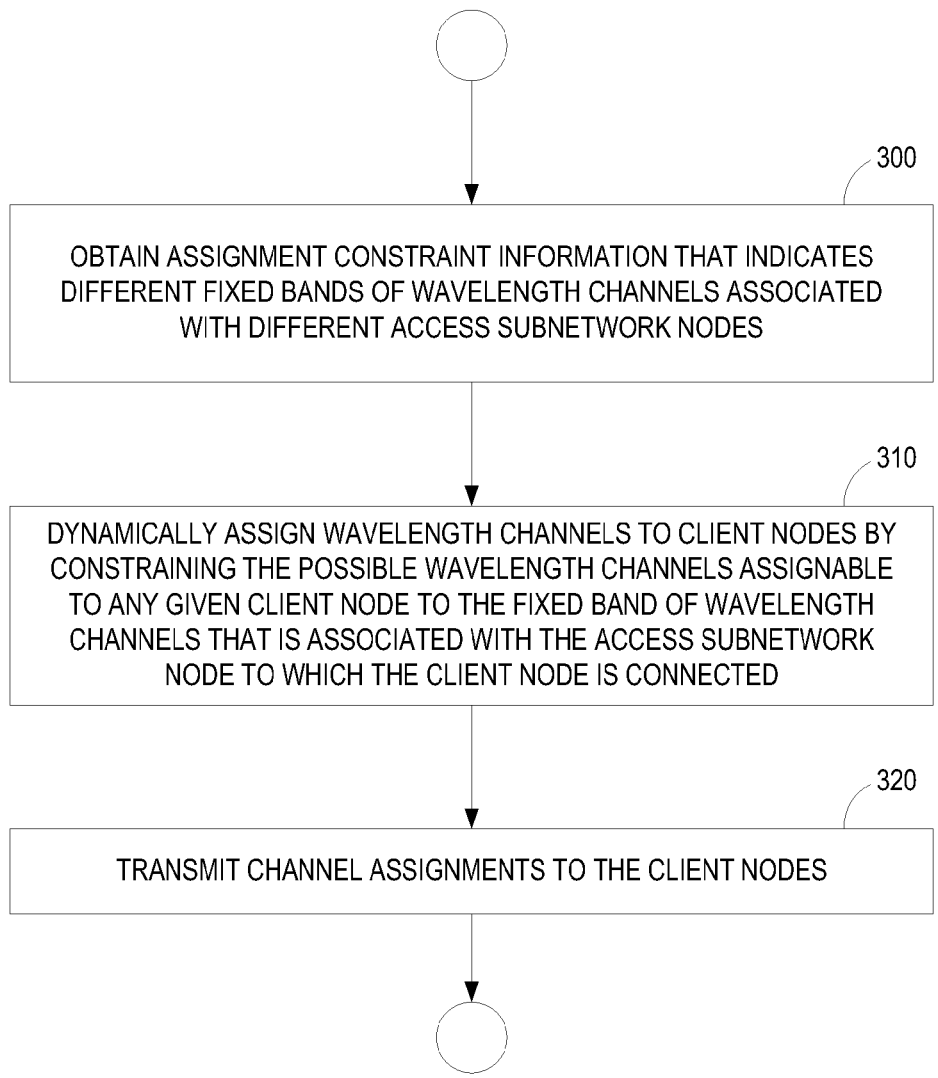
FIG. 11 is a logic flow diagram of a method implemented by a wavelength assignment node according to one or more embodiments.

Finally, those skilled in the art will appreciate that a wavelength assignment node herein generally performs the processing shown in FIG. 11. As shown in FIG. 11, processing includes obtaining assignment constraint information that indicates different fixed bands of wavelength channels associated with different access subnetwork nodes 16 (Block 300). Processing also includes dynamically assigning wavelength channels to client nodes 20 by constraining the possible wavelength channels assignable to any given client node 20 to the fixed band of wavelength channels that is associated with the access subnetwork node 16 to which the client node 20 is connected (Block 310). Finally, processing entails transmitting channel assignments to the client nodes 20 via one or more intermediate nodes (Block 320).

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

In Fig. 6A, Sheet 7 of 13, delete " " and insert -- -- , therefor. 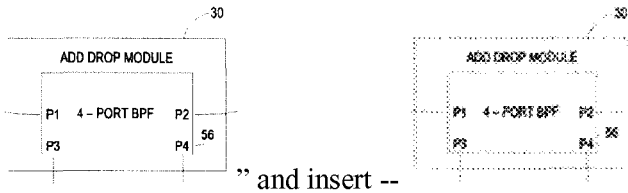

In Fig. 7B, Sheet 9 of 13, delete " " and insert -- -- , therefor. 

In Fig. 8, Sheet 10 of 13, delete " " and insert -- --, therefor. 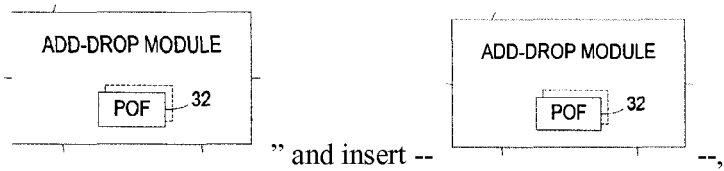

In Fig. 8, Sheet 10 of 13, delete " " and insert -- -- , therefor. 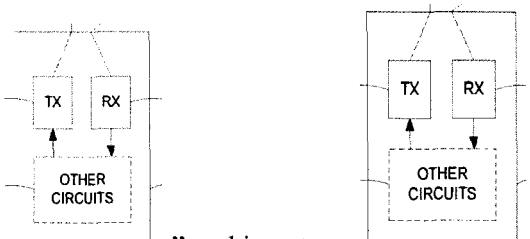

What is claimed is:

1. An access subnetwork node configured to form part of an access subnetwork and comprising one or more add-drop modules, each including one or more passive optical filters, wherein the one or more add-drop modules are configured to:
    selectively drop a fixed band of wavelength channels from the access subnetwork, via a passive directional coupler, to each of multiple client nodes that actively select to receive client-specific channels that a central office transmits within the fixed band to those client nodes, the central office connecting the access subnetwork to a metro network; and
    selectively add the fixed band of wavelength channels to the access subnetwork, as received via a passive directional coupler from the multiple client nodes that actively select to transmit client-specific channels within the fixed band towards the central office;
    wherein the one or more add-drop modules are configured to selectively add and drop the fixed band using one or more passive optical filters, wherein the one or more passive optical filters are non-tunable.

2. The access subnetwork node of claim 1, wherein the access subnetwork comprises an access subnetwork ring, and wherein the one or more add-drop modules are configured to:
    resiliently drop the fixed band from either arm of the access subnetwork ring to each of said client nodes; and
    resiliently add the fixed band to both arms of the access subnetwork ring.

3. The access subnetwork node of claim 2, wherein each add-drop module comprises a 4-port passive optical filter having two ports connected to different arms of the access subnetwork ring and two ports connected to the one or more passive directional couplers.

4. The access subnetwork node of claim 2, wherein each add-drop module comprises a pair of 3-port passive optical filters having one port connected to different arms of the access subnetwork ring, one port connected to the other filter in the pair, and one port connected to the one or more passive directional couplers.

5. The access subnetwork node of claim 2, wherein the access subnetwork ring comprises a bidirectional ring formed from first and second rings of unidirectional optical fiber, and wherein the access subnetwork node comprises:
    a first add-drop module configured to selectively drop the fixed band from the first ring, via a first one of the passive directional couplers, to each of said client nodes and selectively add the fixed band to the first ring as received via a second one of the passive directional couplers; and
    a second add-drop module configured to selectively drop the fixed band from the second ring, via the first coupler, to each of said client nodes and selectively add the fixed band to the second ring via the second coupler.

6. The access subnetwork node of claim 1, wherein the one or more add-drop modules comprise a single add-drop module configured to selectively drop and add the fixed band via the same passive directional coupler.

7. The access subnetwork node of claim 1, wherein the one or more add-drop modules comprise multiple add-drop modules that are each configured to selectively drop and add the fixed band via different passive directional couplers.

8. The access subnetwork node of claim 1, further comprising the one or more passive directional couplers.

9. A method implemented by an access subnetwork node configured to form part of an access subnetwork, wherein the access subset network comprises one or more add-drop modules that each include one or more passive optical filters, wherein the method comprises:
    selectively dropping a fixed band of wavelength channels from the access subnetwork, via a passive directional coupler, to each of multiple client nodes that actively select to receive client-specific channels that a central office transmits within the fixed band towards those client nodes, the central office connecting the access subnetwork to a metro network; and
    selectively adding the fixed band of wavelength channels to the access subnetwork, as received via a passive directional coupler from the multiple client nodes that actively select to transmit client-specific channels within the fixed band towards the central office;
    wherein said selectively adding and dropping the fixed band is performed using one or more passive optical filters, wherein the one or more passive optical filters are non-tunable.

10. The method of claim 9, wherein the access subnetwork comprises an access subnetwork ring, and said dropping and adding comprises:
    resiliently dropping the fixed band from either arm of the access subnetwork ring to each of said client nodes; and
    resiliently adding the fixed band to both arms of the access subnetwork ring.

11. The method of claim 10, wherein the access subnetwork node comprises a single add-drop module that includes a 4-port passive optical filter, wherein said resiliently dropping comprises receiving the fixed band from either arm of the access subnetwork ring at either one of two different ring-side ports of the 4-port filter and outputting that fixed band at a respective one of two client-side ports of the 4-port filter connected to the one or more passive directional couplers, and wherein said resiliently adding comprises receiving the fixed band, via the one or more passive directional couplers, at both of the client-side ports and outputting that fixed band at both of the ring-side ports.

12. The method of claim 10, wherein the access subnetwork node comprises a first add-drop module that includes a first 4-port passive optical filter and a second add-drop module that includes a second 4-port passive optical filter, wherein said resiliently dropping comprises receiving the fixed band from either arm of the access subnetwork ring at a downlink ring-side port of either of the first and second 4-port filters and outputting that fixed band at a respective downlink client-side port of that 4-port filter connected to the one or more passive directional couplers, and wherein said resiliently adding comprises receiving the fixed band, via the one or more passive directional couplers, at uplink client-side ports of both the first and second 4-port filters and outputting that fixed band at uplink ring-side ports of both the first and second 4-port filters.

13. The method of claim 10, wherein the access subnetwork node comprises a single add-drop module that includes a pair of 3-port passive optical filters, wherein said resiliently dropping comprises receiving the fixed band from either arm of the access subnetwork at a ring-side port of either 3-port filter, outputting that fixed band at a client-side port of the respective 3-port filter, and passing other bands of wavelength channels out a pass port of the respective 3-port filter to the other 3-port filter in the pair, and wherein said resiliently adding comprises receiving the fixed band at the client-side ports of both 3-port filters and outputting that fixed band at the ring-side ports of both 3-port filters.

14. The method of claim 10, wherein the access subnetwork node comprises a first add-drop module that includes a first pair of 3-port passive optical filters and a second add-drop module that includes a second pair of 3-port passive optical filters, each pair including a downlink 3-port filter and an uplink 3-port filter, wherein said resiliently dropping comprises receiving the fixed band from either arm of the access subnetwork at a downlink ring-side port of either downlink 3-port filter, outputting that fixed band at a client-side port of that downlink 3-port filter, and passing other bands of wavelength channels out a pass port of that downlink 3-port filter to the uplink 3-port filter in the pair, and wherein said resiliently adding comprises receiving the fixed band at the client-side ports of both uplink 3-port filters and outputting that fixed band at the ring-side ports of both uplink 3-port filters.

15. The method of claim 10, wherein the access subnetwork ring comprises a bidirectional ring formed from first and second rings of unidirectional optical fiber, and wherein said selectively dropping and adding comprises:
using a first add-drop module to selectively drop the fixed band from the first ring, via a first one of the passive directional couplers, to each of said client nodes and selectively add the fixed band to the first ring as received via a second one of the passive directional couplers; and
using a second add-drop module to selectively drop the fixed band from the second ring, via the first coupler, to each of said client nodes and selectively add the fixed band to the second ring via the second coupler.

16. The method of claim 9, wherein said selectively dropping and adding comprises using a single add-drop module to selectively drop and add the fixed band via the same passive directional coupler.

17. The method of claim 9, wherein said selectively dropping and adding comprises using multiple add-drop module to selectively drop and add the fixed band via different passive directional couplers.

18. A client node comprising:
a receiver configured to receive a client-specific channel that a central office transmits to the client node via an access subnetwork node, wherein the receiver is configured to actively select to receive that client-specific channel within a fixed band of wavelength channels that the access subnetwork node selectively drops from an access subnetwork, via a passive directional coupler and using one or more passive optical filters that are non-tunable, to the client node, wherein the central office connects the access subnetwork to a metro network; and
a transmitter configured to transmit a client-specific channel towards the central office via the access subnetwork node, wherein the transmitter is configured to actively select to transmit that client-specific channel within the fixed band, via a passive directional coupler and using one or more passive optical filters that are non-tunable, to the access subnetwork node for selective addition of the fixed band to the access subnetwork.

19. The client node of claim 18, wherein the transmitter is configured to actively select to transmit a client-specific channel to the access subnetwork node via the same passive directional coupler as that via which the client node is dropped the fixed band.

20. The client node of claim 18, wherein the transmitter is configured to actively select to transmit a client-specific channel to the access subnetwork node via a different passive directional coupler than that via which the client node is dropped the fixed band.

21. The client node of claim 20, wherein the access subnetwork comprises a bidirectional access ring formed from first and second rings of unidirectional optical fiber, and wherein the transmitter is configured to transmit a client-specific channel onto the first and second rings via a first one of the different passive directional couplers, and wherein the client node is selectively dropped the fixed band from either the first or second ring via a second one of the different passive directional couplers.

22. The client node of claim 18, wherein the receiver is a coherent optical receiver comprising an optical local oscillator configured to perform said active selection, and wherein the transmitter is configured to transmit a client-specific channel with light from said optical local oscillator.

23. The client node of claim 18, wherein the receiver comprises a tunable selection filter configured to perform said active selection.

24. A method implemented by a client node, comprising:
receiving a client-specific channel that a central office transmits to the client node via an access subnetwork node, by actively selecting to receive that client-specific channel within a fixed band of wavelength channels that the access subnetwork node selectively drops from an access subnetwork, via a passive directional coupler and using one or more passive optical filters that are non-tunable, to the client node, wherein the central office connects the access subnetwork to a metro network; and
transmitting a client-specific channel towards the central office via the access subnetwork node, by actively selecting to transmit that client-specific channel within the fixed band, via a passive directional coupler and using one or more passive optical filters that are non-tunable, to the access subnetwork node for selective addition of the fixed band to the access subnetwork.

25. The method of claim 24, comprising transmitting a client-specific channel to the access subnetwork node via the same passive directional coupler as that via which the client node is dropped the fixed band.

26. The method of claim 24, comprising transmitting a client-specific channel to the access subnetwork node via a different passive directional coupler than that via which the client node is dropped the fixed band.

27. The method of claim 26, wherein the access subnetwork comprises a bidirectional access ring formed from first and second rings of unidirectional optical fiber, and wherein the method comprises transmitting a client-specific channel onto the first and second rings via a first one of the different passive directional couplers, and wherein the client node is selectively dropped the fixed band from either the first or second ring via a second one of the different passive directional couplers.

28. The method of claim 24, comprising coherently receiving a client-specific channel with an optical local oscillator that performs said active selection, and transmitting a client-specific channel with light from said optical local oscillator.

29. The method of claim 24, wherein said actively selecting is performed with a tunable selection filter.

30. A wavelength assignment node comprising:
one or more interfaces configured to communicatively couple the wavelength assignment node to client nodes directly or indirectly via one or more intermediate nodes; and
an assignment controller configured to:
obtain assignment constraint information that indicates different fixed bands of wavelength channels associated with different access subnetwork nodes;
dynamically assign wavelength channels to client nodes by constraining the possible wavelength channels assignable to any given client node to the fixed band of wavelength channels that is associated with the access subnetwork node to which the client node is connected; and
transmit channel assignments to the client nodes via the one or more interfaces.

31. A method of assigning wavelength channels to client nodes, comprising:
obtaining assignment constraint information that indicates different fixed bands of wavelength channels associated with different access subnetwork nodes;
dynamically assigning wavelength channels to client nodes by constraining the possible wavelength channels assignable to any given client node to the fixed band of wavelength channels that is associated with the access subnetwork node to which the client node is connected; and
transmitting channel assignments to the client nodes directly or indirectly via one or more intermediate nodes.

32. The access subnetwork node of claim 1, wherein the fixed band is different from one or more other fixed bands that one or more other access subnetwork nodes are respectively configured to selectively add and drop via one or more respective passive directional couplers.

33. The access subnetwork node of claim 2, wherein the access subnetwork ring comprises a single ring of bidirectional optical fiber, and wherein said one or more add-drop modules comprise only one add-drop module.

34. The method of claim 9, wherein the fixed band is different from one or more other fixed bands that one or more other access subnetwork nodes are respectively configured to selectively add and drop via one or more respective passive directional couplers.

35. The method of claim 10, wherein the access subnetwork ring comprises a single ring of bidirectional optical fiber, and wherein said one or more add-drop modules comprise only one add-drop module.

* * * * *

UNITED STATES PATENT AND TRADEMARK OFFICE
CERTIFICATE OF CORRECTION

PATENT NO. : 9,112,635 B2
APPLICATION NO. : 13/495637
DATED : August 18, 2015
INVENTOR(S) : Öhlén Page 1 of 2

It is certified that error appears in the above-identified patent and that said Letters Patent is hereby corrected as shown below:

In the Drawings

In Fig. 2, Sheet 2 of 13, delete " 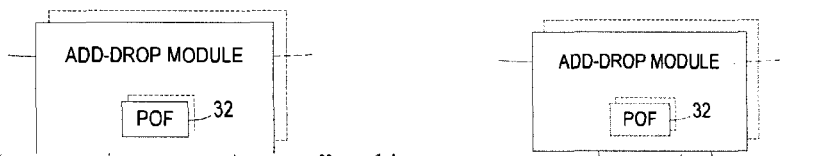 " and insert -- -- , therefor.

In Fig. 2, Sheet 2 of 13, delete "  " and insert -- -- , therefor.

In Fig. 5, Sheet 6 of 13, delete " 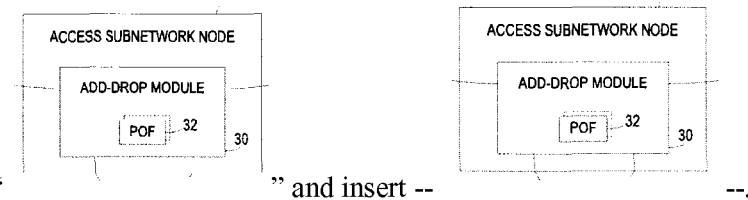 " and insert -- -- , therefor.

In Fig. 5, Sheet 6 of 13, delete " 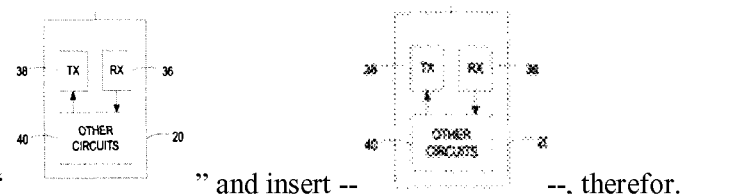 " and insert -- -- , therefor.

Signed and Sealed this
Twenty-second Day of March, 2016

Michelle K. Lee
*Director of the United States Patent and Trademark Office*

CERTIFICATE OF CORRECTION (continued)
U.S. Pat. No. 9,112,635 B2

In the Drawings